US010180724B2

(12) United States Patent
Mishio et al.

(10) Patent No.: US 10,180,724 B2
(45) Date of Patent: Jan. 15, 2019

(54) OPERATING TERMINAL AND OPERATING METHOD

(71) Applicant: OLYMPUS CORPORATION, Hachioji-shi, Tokyo (JP)

(72) Inventors: Yuki Mishio, Hino (JP); Hiroki Koyama, Hachioji (JP); Yoshihisa Ogata, Hachioji (JP); Naohisa Nakada, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 448 days.

(21) Appl. No.: 14/699,071

(22) Filed: Apr. 29, 2015

(65) Prior Publication Data

US 2015/0316989 A1  Nov. 5, 2015

(30) Foreign Application Priority Data

May 1, 2014  (JP) .................................. 2014-094841

(51) Int. Cl.
*G06F 3/01* (2006.01)
*G06F 3/041* (2006.01)
(Continued)

(52) U.S. Cl.
CPC ............ *G06F 3/016* (2013.01); *G06F 3/0412* (2013.01); *G06F 3/0416* (2013.01);
(Continued)

(58) Field of Classification Search
CPC ..... G09B 21/002; G09B 21/003; G06F 3/016; G06F 3/0412; G06F 3/0416; G06F 3/0488
(Continued)

(56) References Cited

U.S. PATENT DOCUMENTS 8,203,537 B2 * 6/2012 Tanabe .................. G06F 1/1626
345/156
2002/0105496 A1 * 8/2002 Giuliani ............... G09B 21/003
345/156
(Continued)

FOREIGN PATENT DOCUMENTS

CN  1653503 A   8/2005
CN  101907922 A  12/2010
(Continued)

OTHER PUBLICATIONS

Office Action dated Sep. 1, 2017 in corresponding Chinese Patent Application No. 201510208175.6, consisting of 15 pp. (English Translation Provided).

(Continued)

*Primary Examiner* — Amare Mengistu
*Assistant Examiner* — Gloryvid Figueroa-Gibson
(74) *Attorney, Agent, or Firm* — Volpe and Koenig, P.C.

(57) ABSTRACT

An operating terminal operates an external device for projecting and retracting a part of the external device, and includes: a display unit that displays an image; a touch panel on the display unit, and configured to detect a touched area of an object and to receive a position signal in response to the touched area; a determining unit that determines a change of the touched area on the touch panel, based on the position signal; a detecting unit that detects a boundary of areas having different features in the touched area in the image; and a signal generating unit that generates a drive signal indicating a drive amount for causing the part of the external device to be projected and retracted, based on a determination result by the determining unit and a detection result by the detecting unit, and outputs the drive signal to the external device.

11 Claims, 17 Drawing Sheets

(51) Int. Cl.
*G06F 3/0488* (2013.01)
*G09B 21/00* (2006.01)

(52) U.S. Cl.
CPC ......... *G06F 3/0488* (2013.01); *G09B 21/002* (2013.01); *G09B 21/003* (2013.01)

(58) Field of Classification Search
USPC .......................................................... 345/173
See application file for complete search history.

(56) References Cited

U.S. PATENT DOCUMENTS

| | | | |
|---|---|---|---|
| 2008/0150911 A1 | 6/2008 | Harrison | |
| 2011/0111375 A1* | 5/2011 | Luu | G09B 21/004 434/114 |
| 2012/0062516 A1 | 3/2012 | Chen | |
| 2012/0139844 A1* | 6/2012 | Ramstein | G06F 3/016 345/173 |
| 2012/0315607 A1 | 12/2012 | Shin | |

FOREIGN PATENT DOCUMENTS

| | | |
|---|---|---|
| JP | H10-69539 A | 3/1998 |
| JP | 2002-268791 A | 9/2002 |
| JP | 2003256133 A | 9/2003 |
| JP | 2004219558 | 8/2004 |
| JP | 2010-176245 A | 8/2010 |
| JP | 2011-510403 A | 3/2011 |
| JP | 2011-146821 A | 7/2011 |
| JP | 2012-156607 | 8/2012 |
| JP | 2012-529091 A | 11/2012 |
| TW | I293026 | 2/2008 |

OTHER PUBLICATIONS

Office Action dated Feb. 6, 2018 in corresponding Japanese Patent Application No. 2014-094841, consisting of 5 pp. (English Translation Provided).

* cited by examiner

OPERATING TERMINAL AND OPERATING METHOD

CROSS-REFERENCE TO RELATED APPLICATIONS

This application is based upon and claims the benefit of priority from Japanese Patent Application No. 2014-094841, filed on May 1, 2014, the entire contents of which are incorporated herein by reference.

BACKGROUND

1. Technical Field

The disclosure relates to an operating terminal and an operating method for operating an external device in which a part of members thereof is adapted to be projected and retracted to be displaced.

2. Related Art

In recent years, many operating terminals with a touch panel provided on a display screen of a display unit that displays images and information are used. A user performs various operations through the touch panel. In such operating terminals, a technology is known, in which the user can perform an operation through the touch panel even he or she is a person with impaired vision (for example, see Japanese Patent Application Laid-open No. 2012-156607). In this technology, when the display unit displays information, and the touch panel is touched, the information displayed at a touched position is converted into Braille and output.

SUMMARY

In some embodiments, an operating terminal operates an external device configured to project and retract a part of a surface of the external device. The operating terminal includes: a display unit configured to display an image; a touch panel provided superimposed on a display area of the display unit, and configured to detect a touched area of an object from an outside and to receive a position signal in response to the touched area; a determining unit configured to determine a change of the touched area on the touch panel, based on the position signal received by the touch panel; a detecting unit configured to detect a boundary of areas having different features in the touched area in the image; and a signal generating unit configured to generate a drive signal that indicates a drive amount for causing the part of the surface of the external device to be projected and retracted, based on a determination result determined by the determining unit and a detection result detected by the detecting unit, and to output the drive signal to the external device.

In some embodiments, an operating method is executed by an operating terminal for operating an external device configured to project and retract a part of a surface of the external device. The operating terminal includes: a display unit configured to display an image; and a touch panel provided superimposed on a display area of the display unit, and configured to detect a touched area of an object from an outside and to receive a position signal in response to the touched area. The method includes: determining a change of the touched area on the touch panel, based on the position signal received by the touch panel; detecting a boundary of areas having different features in the touched area in the image; and generating a drive signal that indicates a drive amount for causing the part of the surface of the external device to be projected and retracted, based on a determina- tion result in determining the change of the touched area on the touch panel and a detection result in detecting the boundary of the areas having different features in the touched area in the image, and outputting the drive signal to the external device.

The above and other features, advantages and technical and industrial significance of this invention will be better understood by reading the following detailed description of presently preferred embodiments of the invention, when considered in connection with the accompanying drawings.

DETAILED DESCRIPTION

Modes for carrying out the present invention (hereinafter, referred to as embodiments) will be described below with reference to the drawings. The present invention is not limited by the embodiments below. The same reference signs are used to designate the same elements throughout the drawings.

First Embodiment

Schematic Configuration of Operating System

Figure 1:
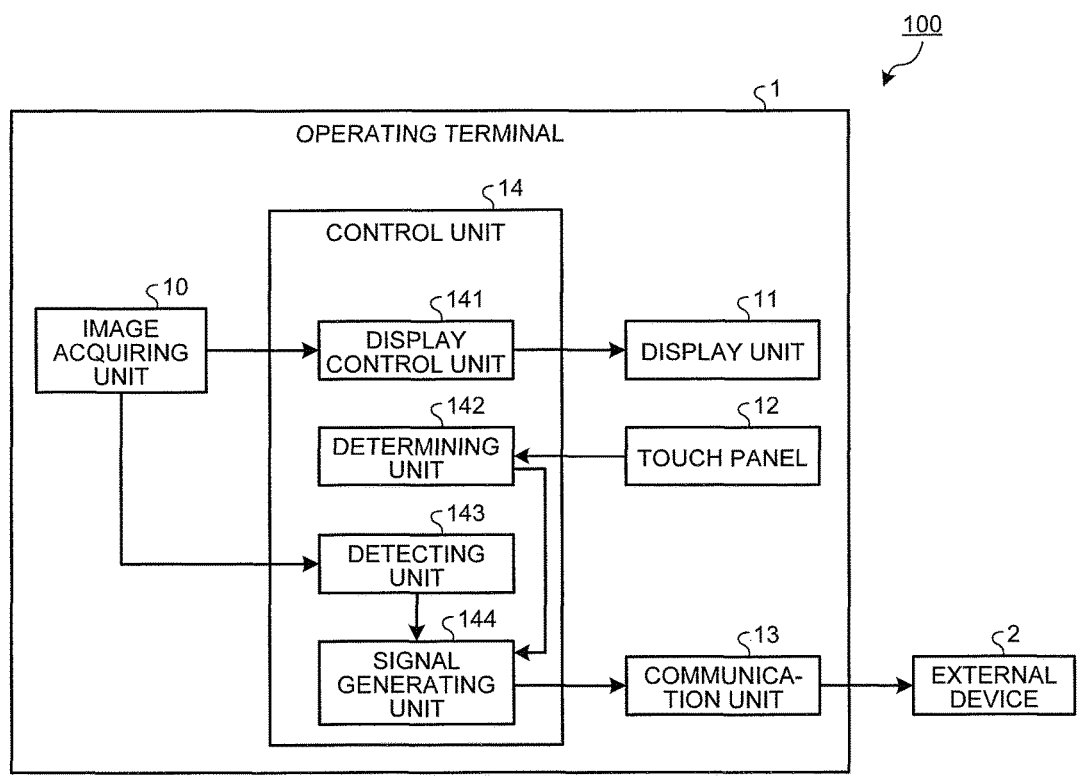
FIG. 1 is a block diagram illustrating a functional configuration of an operating system according to a first embodiment of the present invention.

FIG. 1 is a block diagram illustrating a functional configuration of an operating system according to the first embodiment of the present invention. An operating system 100 illustrated in FIG. 1 includes an operating terminal 1 that displays an image and receives an input from a user, and an external device 2 adapted to project and retract a part of a surface thereof, based on a signal input from the operating terminal 1.

Configuration of Operating Terminal

First, a configuration of the operating terminal 1 will be described.

The operating terminal 1 includes an image acquiring unit 10, a display unit 11, a touch panel 12, a communication unit 13, and a control unit 14.

The image acquiring unit 10 images a subject, and acquires (generates) image data of the subject. The image acquiring unit 10 is configured by an optical system that forms a subject image, and an imaging element such as a charge coupled device (CCD) or a complementary metal oxide semiconductor (CMOS) that receives the subject image formed by the optical system and performs photoelectric conversion to generate the image data. Here, the image data includes distance information that indicates a distance of the subject, luminance information that indicates brightness, and color information that indicates a color. Note that the image acquiring unit 10 may acquire the image data from an external device or from a recording medium for recording image data. Further, the image acquiring unit 10 may acquire the image data from a server that records image data, through a network.

The display unit 11 displays an image corresponding to the image data acquired by the image acquiring unit 10 under control of the control unit 14. The display unit 11 is configured by a display panel made of liquid crystal or organic electro luminescence (organic EL), a drive driver, and the like.

The touch panel 12 is provided superimposed on a display area of the display unit 11. The touch panel 12 detects a touched area by an object from an outside, and receives an input of a position signal according to the touched area.

The communication unit 13 transmits a drive signal for displacing the external device 2 to the external device 2 according to a specified communication standard, under control of the control unit 14.

The control unit 14 generally controls an operation of the operating terminal 1 by transferring instructions and data to the respective units that configure the operating terminal 1. The control unit 14 is configured by a central processing unit (CPU).

Here, a detailed configuration of the control unit 14 will be described. The control unit 14 includes a display control unit 141, a determining unit 142, a detecting unit 143, and a signal generating unit 144.

The display control unit 141 controls a display form of the display unit 11. To be specific, the display control unit 141 displays, in the display unit 11, the image corresponding to the image data acquired by the image acquiring unit 10.

The determining unit 142 determines area change of the touched area by a user, on the touch panel 12, based on the position signal, the input of which is received by the touch panel 12. For example, the determining unit 142 determines a locus of the area change of the touched area on the touch panel 12. Here, the touched area is an area having a touched position as a center.

The detecting unit 143 detects a boundary of areas having different features in the touched area determined by the determining unit 142, in the image displayed on the display unit 11. To be specific, the detecting unit 143 detects respective pieces of distance information of a plurality of target objects (subjects) included in the image corresponding to the image data acquired by the image acquiring unit 10, and detects the distance information and a boundary of areas having different distances in the touched area determined by the determining unit 142. In this case, the detecting unit 143 detects the distances of areas of the target objects, based on image surface phase difference data (distance information) included in the image data. Note that the detecting unit 143 may detect not only the distances of the areas of the target objects, but also any of the color information, the luminance information, and a contour. In this case, the detecting unit 143 detects light and darkness of the luminance information, and the contour, by performing binarization processing for the image data.

The signal generating unit 144 generates the drive signal that indicates a projection and retraction amount for causing a part of the external device 2 to be projected and retracted, based on a determination result of the determining unit 142 and a detection result of the detecting unit 143, and outputs the drive signal to the external device 2.

Configuration of External Device

Next, a configuration of the external device 2 will be described.

Figure 2:
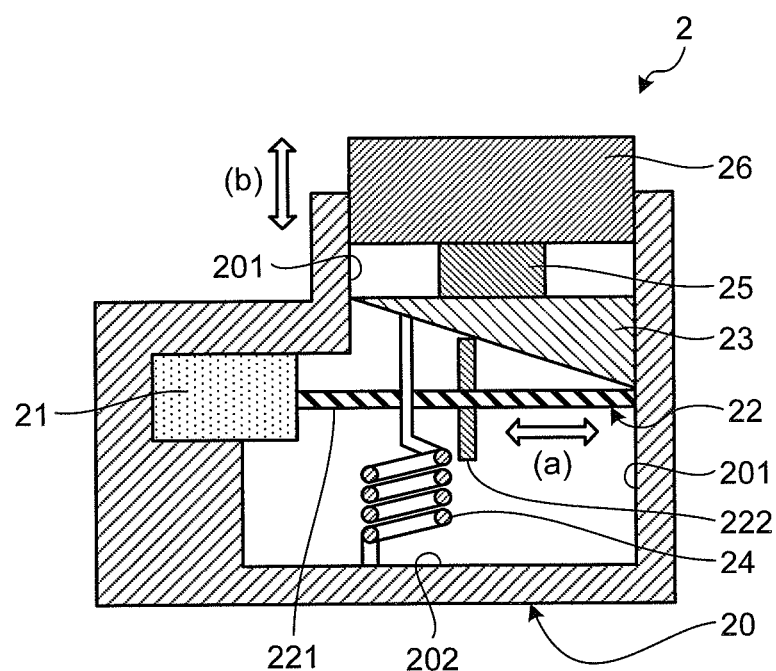
FIG. 2 is a schematic configuration diagram schematically illustrating a cross section of an external device according to the first embodiment of the present invention.

FIG. 2 is a schematic configuration diagram schematically illustrating a cross section of the external device 2. The external device 2 illustrated in FIG. 2 includes a housing 20, a drive unit 21, a transmission unit 22, a pressing member 23, an energizing member 24, a supporting member 25, and a displacement transmitting member 26.

The housing 20 has a cylindrical shape with a bottom, and houses the drive unit 21, the transmission unit 22, the pressing member 23, the energizing member 24, the supporting member 25, and the displacement transmitting member 26 therein.

The drive unit 21 rotates the transmission unit 22 by driving the transmission unit 22, based on the drive signal input from the operating terminal 1. The drive unit 21 is configured by a stepping motor, a DC motor, or the like.

The transmission unit 22 is connected to the drive unit 21, and includes a rotary unit 221 rotated according to driving of the drive unit 21, and a feed screw 222 moved in the right and left direction (see the arrow (a) in FIG. 2) according to the rotation of the rotary unit 221.

The pressing member 23 has an approximately triangular pyramid shape, and is movably provided in a vertical direction along a side wall 201 of the housing 20. The pressing member 23 is moved in the vertical direction by abutting on the feed screw 222.

The energizing member 24 is connected to a bottom part 202 of the housing 20 and the pressing member 23, and energizes the pressing member 23 toward the bottom part 202. The energizing member 24 is configured by a spring or the like.

The supporting member 25 is provided on the pressing member 23, and supports the displacement transmitting member 26. The supporting member 25 has an approximately columnar shape, and is configured by an elastic object, rubber, or the like.

The displacement transmitting member 26 is movably provided in the vertical direction (see the arrow (b) of FIG. 2) along the side wall 201 of the housing 20. The displacement transmitting member 26 protrudes from the housing 20 by being pressed by the pressing member 23 through the supporting member 25.

The external device 2 configured as described above moves the position of the feed screw 222 on the rotary unit 221 by driving of the drive unit 21, based on the drive signal input from the operating terminal 1, thereby to move the position of the displacement transmitting member 26 so as to be projected and retracted in the vertical direction.

Processing of Operating Terminal

Figure 3:
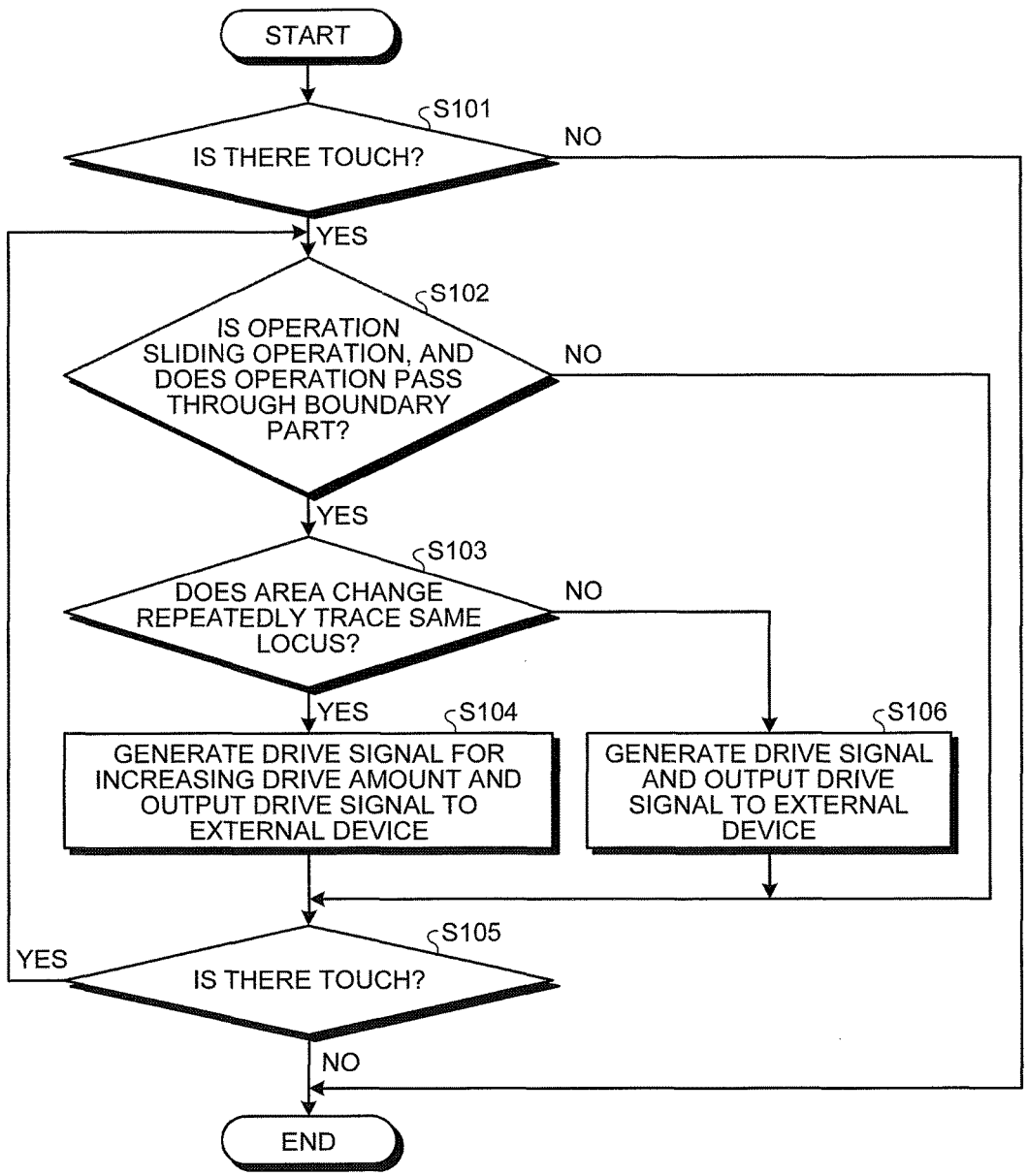
FIG. 3 is a flowchart illustrating an outline of processing executed by an operating terminal according to the first embodiment of the present invention.

Next, processing executed by the operating terminal 1 will be described. FIG. 3 is a flowchart illustrating an outline of the processing executed by the operating terminal 1.

Figure 4:
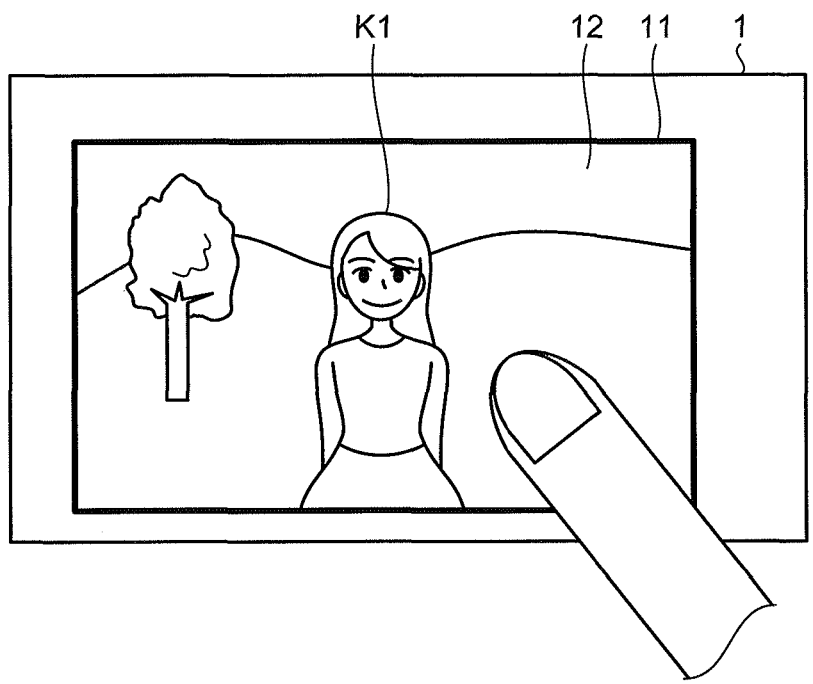
FIG. 4 is a diagram schematically illustrating a state in which a user touches an operating terminal according to the first embodiment of the present invention.

As illustrated in FIG. 3, the determining unit 142 determines whether there has been a touch to the touch panel 12 (step S101). To be specific, as illustrated in FIG. 4, the determining unit 142 determines whether the touch panel 12 has been touched. When the determining unit 142 determines that there has been a touch to the touch panel 12 (Yes at step S101), the operating terminal 1 proceeds to step S102. On the other hand, when the determining unit 142 determines that there has been no touch to the touch panel 12 (No at step S101), the operating terminal 1 terminates the present processing.

At step S102, the determining unit 142 determines whether the touch operation of the user is a sliding operation, and the sliding operation has passed through a boundary part of the features of the image or the subject (target object) (step S102). In this case, at the time of the sliding operation by the user, the determining unit 142 may determine a time at which the feature of the image detected by the detecting unit 143 is changed. The determining unit 142 may hold a change point of the image in advance like a database, and determine the time at which a finger is slid from a place not corresponding to the change point to a place corresponding to the change point. Further, improvement may be added such that the determination is not performed when the finger is slid along the contour.

Figure 5A:
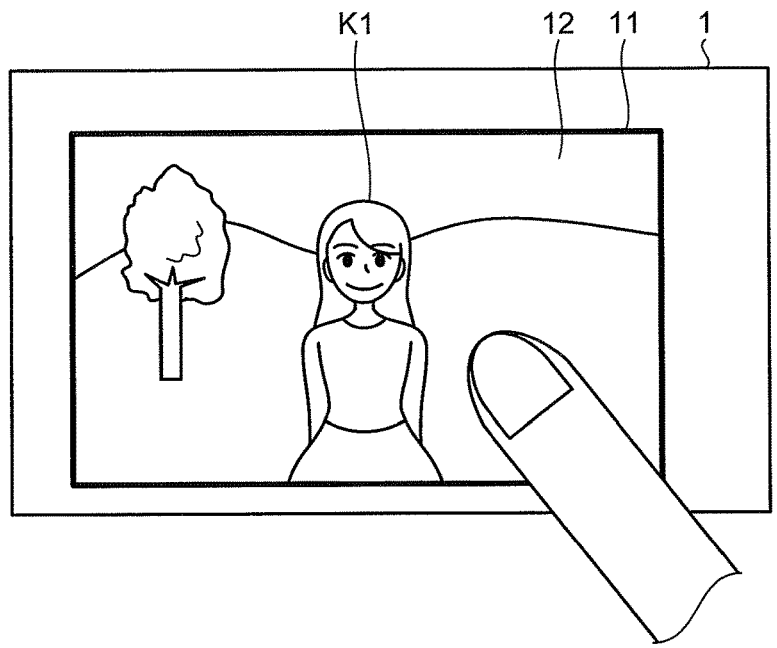
FIG. 5A is a diagram schematically illustrating a state in which the user performs a sliding operation to the operating terminal according to the first embodiment of the present invention.
Figure 5B:
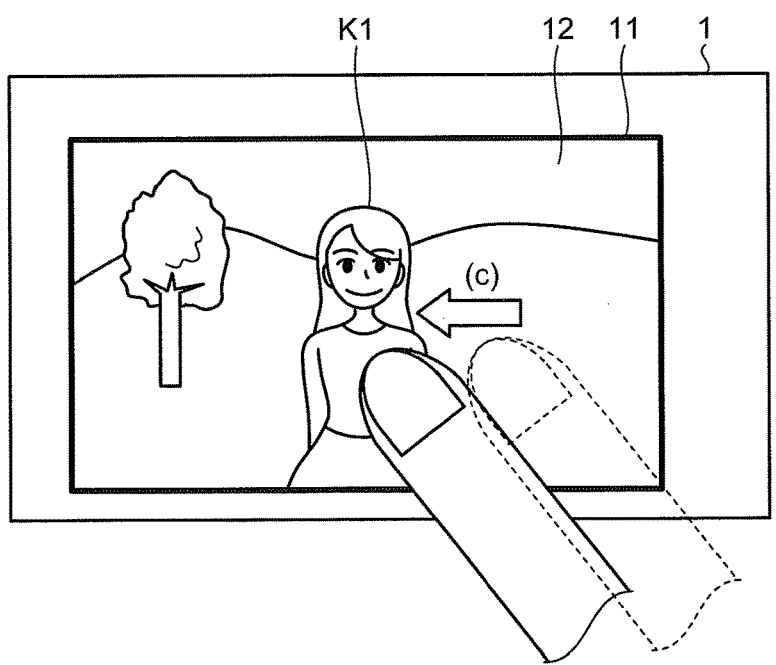
FIG. 5B is a diagram schematically illustrating a state in which the user performs the sliding operation to the operating terminal according to the first embodiment of the present invention.

For example, as illustrated in FIGS. 5A and 5B, the determining unit 142 determines whether the touch operation is the sliding operation in which the user moves the finger to the left direction (see the arrow (c)) while keeping the touch to the touch panel 12, based on the position signal sequentially input through the touch panel 12 (FIG. 5A→FIG. 5B). In this case, the determining unit 142 determines whether the touch operation of the user is the sliding operation according to the area change of the touched area (change of a feature of the image of each area) sequentially input through the touch panel 12. At this time, the detecting unit 143 detects a boundary of areas having different features, for example, one or more of the distance information, luminance components, and color components, in the touched area in the image displayed on the display unit 11. When the determining unit 142 determines that the touch operation of the user is the sliding operation, and the sliding operation has passed through the boundary part of the features of the subject (target object) (Yes at step S102), the operating terminal 1 proceeds to step S103 described below. On the other hand, when the determining unit 142 determines that the touch operation of the user is not the Sliding operation (No at step S102), the operating terminal 1 proceeds to step S105 described below. Note that the boundary determined by the detecting unit 143 can be detected only with the image, and may be determined according to the change of the feature of the image. However, other signals such as distribution of perspective determination using information at the time of auto focusing associated with each position or area such as coordinates of the image may be used together.

At step S103, the determining unit 142 determines whether the area change of the touched area repeatedly traces the same locus. When the determining unit 142 determines that the area change of the touched area repeatedly traces the same locus (Yes at step S103), the operating terminal 1 proceeds to step S104 described below. On the other hand, when the determining unit 142 determines that the area change of the touched area does not repeatedly trace the same locus (No at step S103), the operating terminal 1 proceeds to step S106 described below.

Figure 6:
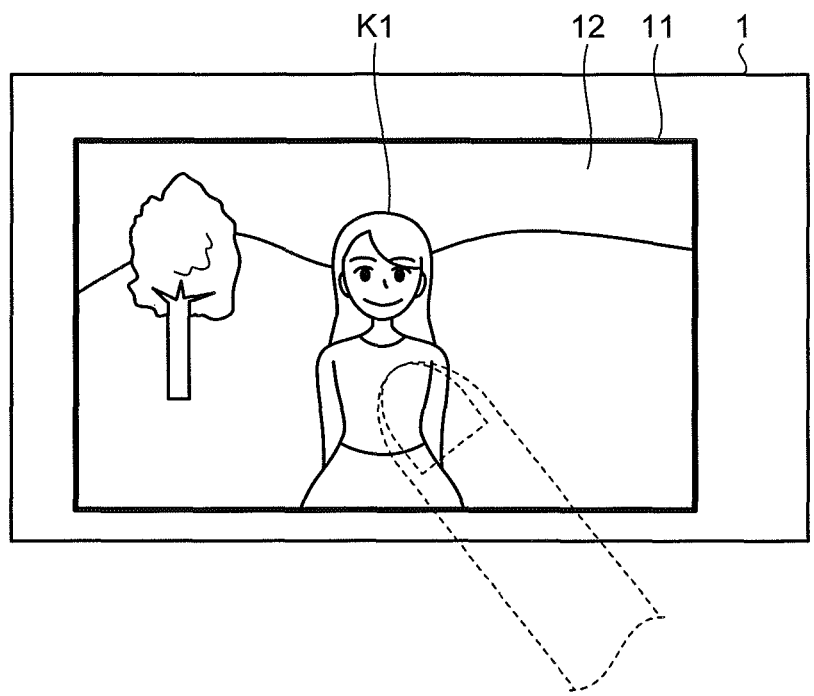
FIG. 6 is a diagram schematically illustrating a state of when a signal generating unit of the operating terminal according to the first embodiment of the present invention generates a drive signal.
Figure 7A:
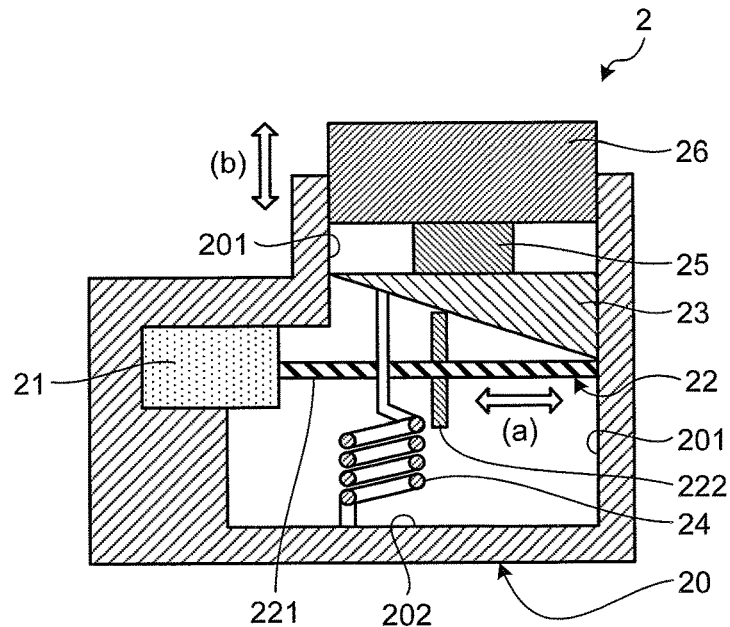
FIG. 7A is an operation diagram for schematically describing an operation of the external device according to the first embodiment of the present invention.
Figure 7B:
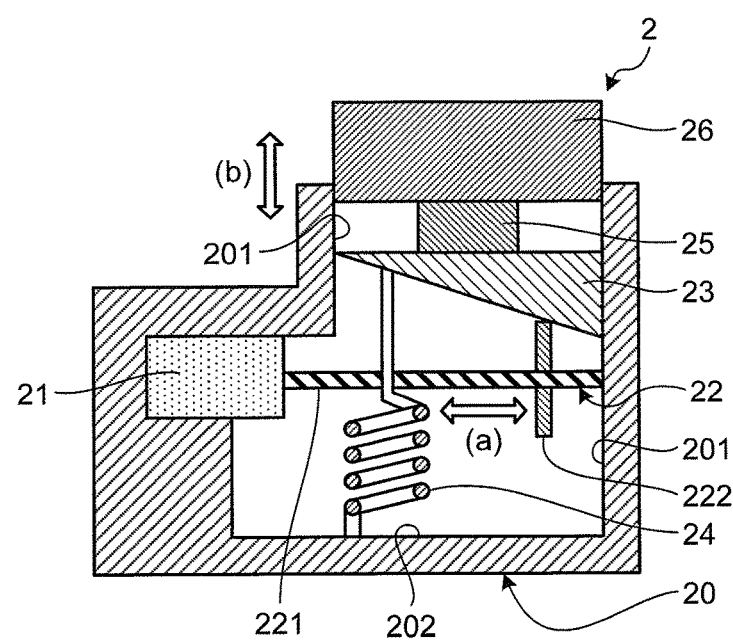
FIG. 7B is an operation diagram for schematically describing an operation of the external device according to the first embodiment of the present invention.

At step S104, the signal generating unit 144 generates the drive signal to increase a projection and retraction amount for causing a part of the external device 2 to be projected and retracted, based on the determination result determined by the determining unit 142 and the detection result detected by the detecting unit 143, and outputs the drive signal to the external device 2. To be specific, as illustrated in FIG. 6, the signal generating unit 144 generates the drive signal that indicates an increased drive amount, based on the boundary of the area of a subject K1 detected by the detecting unit 143, for example, the boundary where the distance between a background and the subject K1 is changed, and the touched area determined by the determining unit 142, and outputs the drive signal to the external device 2. Accordingly, as illustrated in FIGS. 7A and 7B, in the external device 2, the drive unit 21 is driven based on the drive signal input from the operating terminal 1, so that the displacement transmitting member 26 is raised in a large manner (FIG. 7A→FIG. 7B). As a result, the user can intuitively grasp the boundary between the subject K1 and the background in the image displayed on the display unit 11.

Following that, when there has been a touch to the touch panel 12 (Yes at step S105), the operating terminal 1 proceeds to step S102. On the other hand, when there has been no touch to the touch panel 12 (No at step S105), the operating terminal 1 terminates the present processing.

At step S106, the signal generating unit 144 generates the drive signal that indicates the drive amount for causing a part of the external device 2 to be projected and retracted, based on the determination result determined by the determining unit 142 and the detection result detected by the detecting unit 143, and outputs the drive signal to the external device 2. After step S106, the operating terminal 1 proceeds to step S105.

According to the first embodiment of the present invention described above, the signal generating unit 144 generates the drive signal that indicates the drive amount for causing a part of the external device 2 to be projected and retracted, based on the determination result determined by the determining unit 142 and the detection result detected by the detecting unit 143 and outputs the drive signal to the external device 2 to causes a part of the external device 2 to be projected and retracted. Therefore, even a user with impaired vision can intuitively grasp the image displayed on the display unit 11.

Further, according to the first embodiment of the present invention, when the determining unit 142 determines that the area change of the touched area repeatedly traces the same locus, the signal generating unit 144 generates the drive signal that indicates an increased drive amount and outputs the drive signal to the external device 2 to cause a part of the external device 2 to be projected and retracted further. Therefore, the user can further grasp the image displayed on the display unit 11.

Modification of First Embodiment

Figure 8:
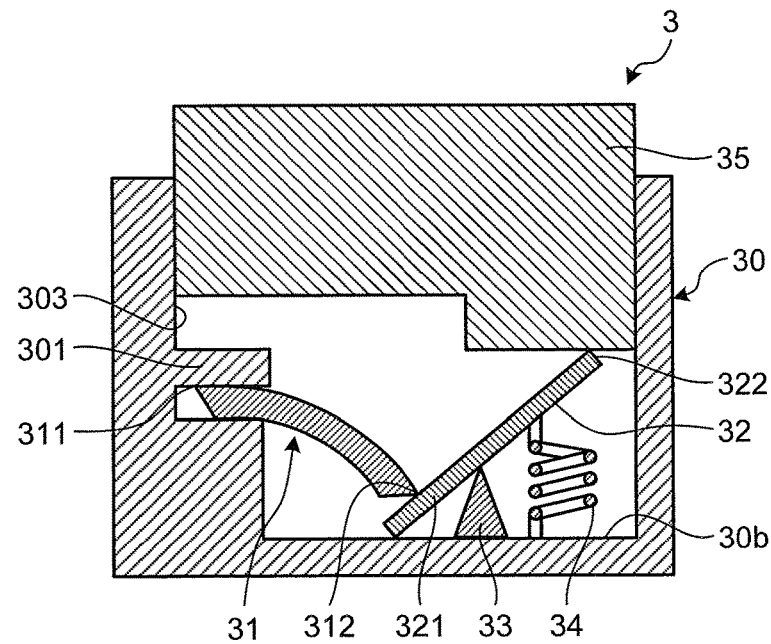
FIG. 8 is a schematic configuration diagram schematically illustrating a cross section of an external device according to a modification of the first embodiment of the present invention.

FIG. 8 is a schematic configuration diagram schematically illustrating a cross section of an external device according to a modification of the first embodiment. An external device 3 illustrated in FIG. 8 includes a housing 30, a displacement portion 31, a pressing member 32, a supporting member 33, an energizing member 34, and a displacement transmitting member 35.

The housing 30 has a cylindrical shape with a bottom, and houses the displacement portion 31, the pressing member 32, the supporting member 33, the energizing member 34, and the displacement transmitting member 35 therein. The housing 30 includes a holding unit 301 therein, which holds one end of the displacement portion 31.

The displacement portion 31 has a flat plate shape. One end part 311 is held by the holding unit 301, and the other end part 312 is provided abutting on the pressing member 32. The displacement portion 31 is displaced according to the drive signal input from the operating terminal 1. To be specific, the displacement portion 31 has the other end part 312 displaced in an up and down direction with the one end part 311 as a fulcrum, according to the drive signal input from the operating terminal 1. The displacement portion 31 is configured by a polymer actuator or bimetal.

The pressing member 32 is provided on a bottom part 30b of the housing 30 through the supporting member 33. The pressing member 32 has one end part 321 abut on the other end part 312 of the displacement portion 31, and the other end part 322 abut on the displacement transmitting member 35.

The energizing member 34 is connected to the pressing member 32 and the bottom part 30b, and energizes the pressing member 32 toward the displacement transmitting member 35. The energizing member 34 is configured by a spring or the like.

The displacement transmitting member 35 is movably provided in a vertical direction along a side wall 303 of the housing 30. The displacement transmitting member 35 protrudes from the housing 30 by being pressed by the pressing member 32.

According to the modification of the first embodiment of the present invention as described above, in the external device 3, the displacement portion 31 is displaced based on the drive signal input from the operating terminal 1, so that the displacement transmitting member 35 is moved. Therefore, even a user without knowledge about Braille or a user with impaired vision can intuitively grasp content of the image displayed on the display unit 11 or a composition at the time of capturing an image.

Second Embodiment

Next, a second embodiment of the present invention will be described. In the second embodiment, an operating terminal has a different configuration from the operating terminal according to the first embodiment described above. To be specific, the operating terminal according to the second embodiment includes a displacement generating unit including a plurality of external devices according to the first embodiment. Therefore, hereinafter, a configuration of the operating terminal according to the second embodiment will be described, and then, processing executed by the operating terminal according to the second embodiment will be described. The same elements as the operating terminal 1 and the external device 2 according to the first embodiment are denoted by the same reference signs, and description is omitted.

Configuration of Operating Terminal

Figure 9:
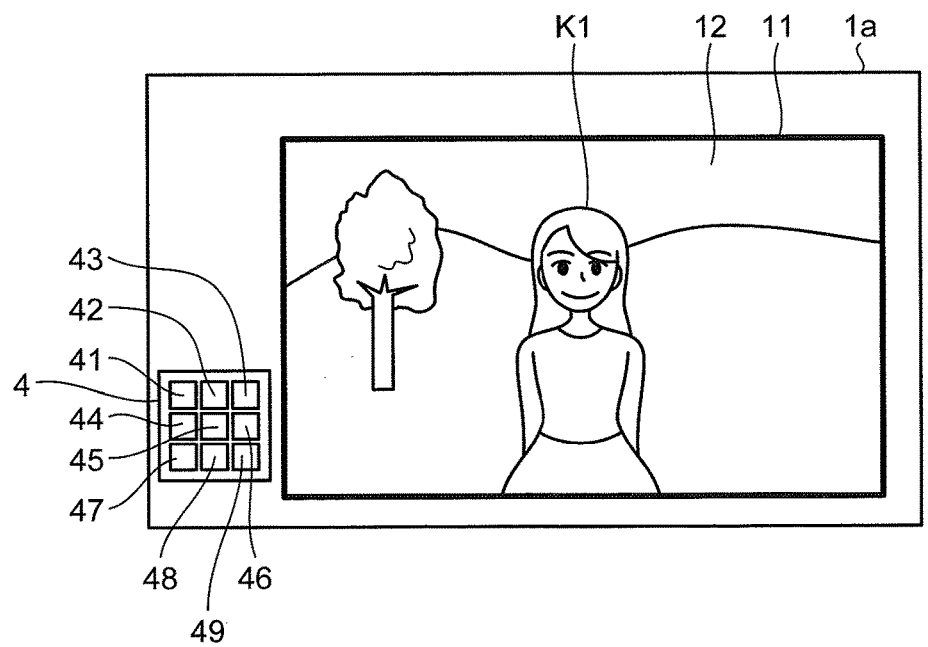
FIG. 9 is a schematic configuration diagram of an operating terminal according to a second embodiment of the present invention.
Figure 10:
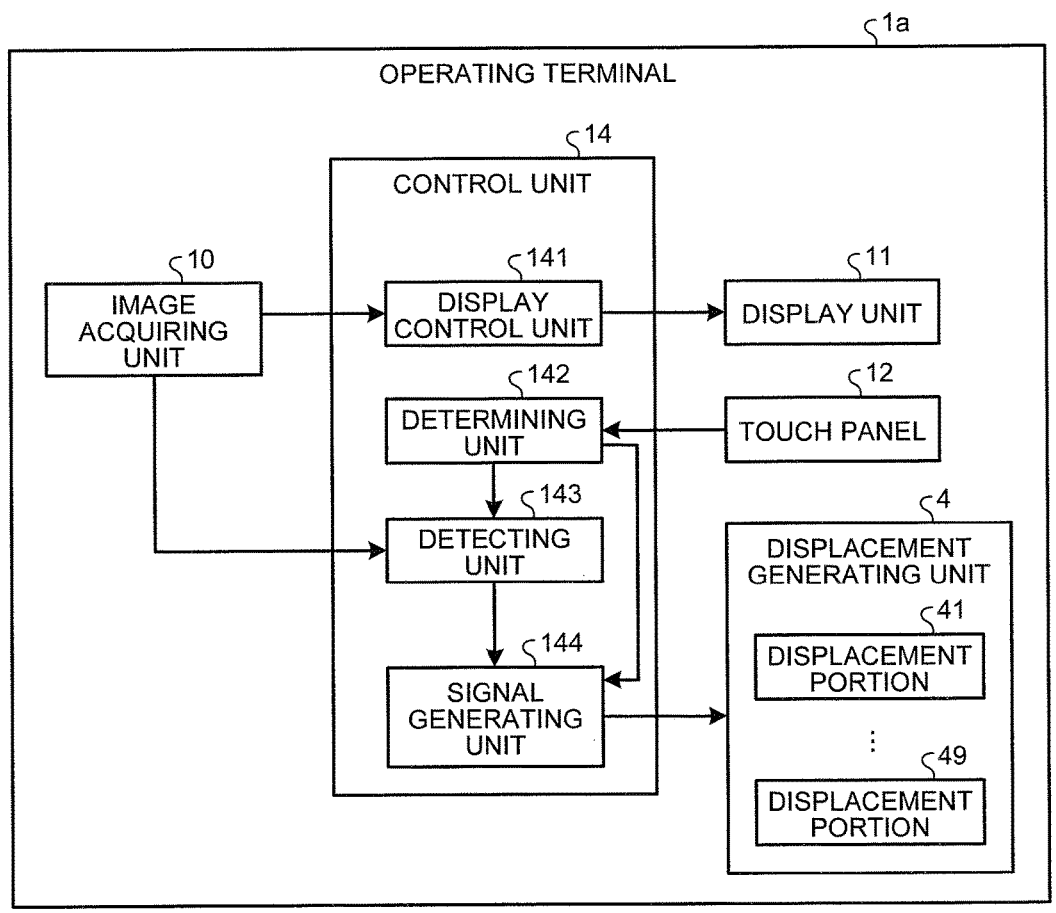
FIG. 10 is a block diagram illustrating a functional configuration of the operating terminal according to the second embodiment of the present invention.

FIG. 9 is a schematic configuration diagram of the operating terminal according to the second embodiment. FIG. 10 is a block diagram illustrating a functional configuration of the operating terminal according to the second embodiment.

An operating terminal 1a illustrated in FIGS. 9 and 10 includes an image acquiring unit 10, a display unit 11, a touch panel 12, a control unit 14, and a displacement generating unit 4.

The displacement generating unit 4 includes displacement portions 41 to 49. To be specific, the displacement generating unit 4 has the displacement portions 41 to 49 arranged in a matrix manner. For example, the displacement generating unit 4 has the displacement portions 41 to 49 arranged in 3×3 manner. The displacement portions 41 to 49 have a similar configuration to the external device 2 or 3 of the first embodiment, and are projected and retracted according to drive signals under control of the control unit 14. Note that the number of the displacement portions 41 to 49 is not limited to 9, and can be appropriately changed. For example, 16 (4×4) displacement portions may be arranged.

Processing of Operating Terminal

Figure 11:
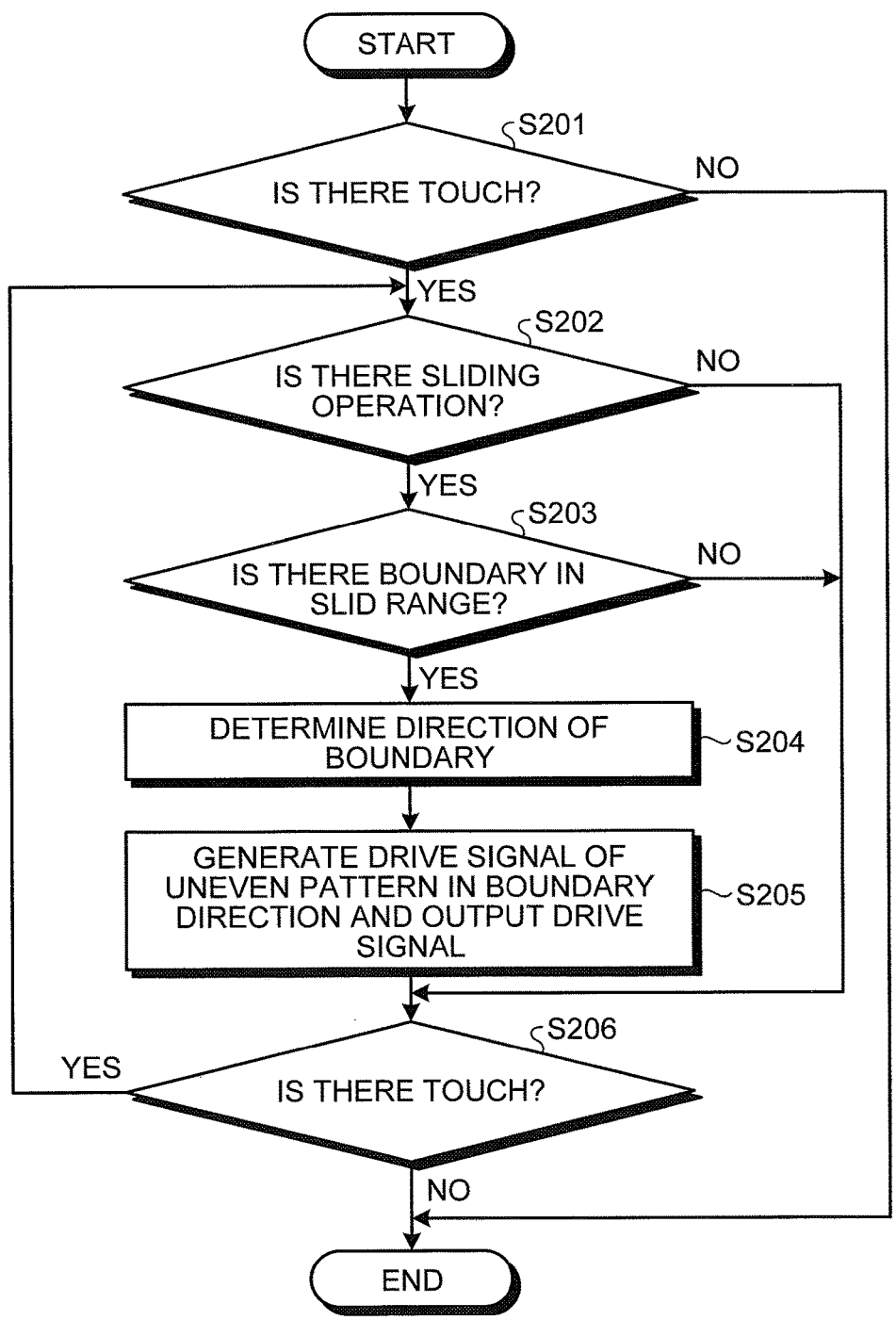
FIG. 11 is a flowchart illustrating an outline of processing executed by the operating terminal according to the second embodiment of the present invention.

Next, processing executed by the operating terminal 1a will be described. FIG. 11 is a flowchart illustrating an outline of the processing executed by the operating terminal 1a.

As illustrated in FIG. 11, a determining unit 142 determines whether there has been a touch to the touch panel 12 (step S201). When the determining unit 142 determines that there has been a touch to the touch panel (Yes at step S201), the operating terminal 1a proceeds to step S202 described below. On the other hand, when the determining unit 142 determines that there has been no touch to the touch panel 12 (No at step S201), the operating terminal 1a terminates the present processing.

Figure 12:
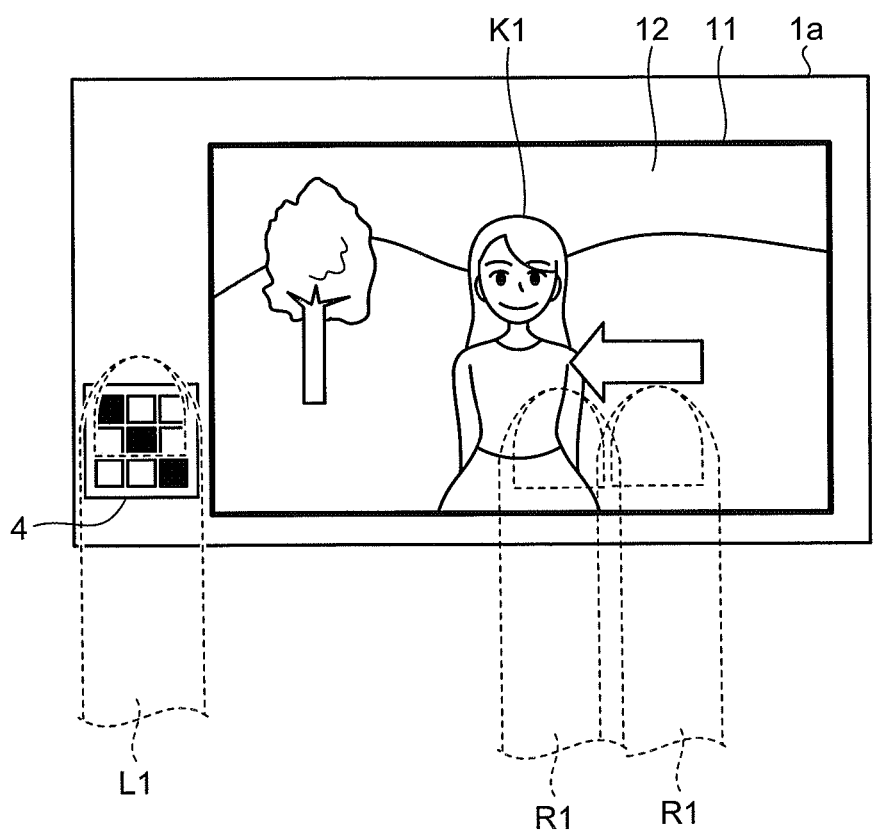
FIG. 12 is a diagram schematically illustrating a state in which a user performs a sliding operation to the operating terminal according to the second embodiment of the present invention.

At step S202, the determining unit 142 determines whether the touch by a user is a sliding operation. For example, the determining unit 142 determines whether the touch is the sliding operation in which the user moves a finger to a left direction while keeping the touch to the touch panel 12, as illustrated in FIG. 12. When the determining unit 142 determines that the touch by the user is the sliding operation (Yes at step S202), the operating terminal 1*a* proceeds to step S203 described below. On the other hand, when the determining unit 142 determines that the touch by the user is not the sliding operation (No at step S202), the operating terminal 1*a* proceeds to step S206 described below.

At step S203, the detecting unit 143 determines whether there is a boundary of areas having different features in a slid range where the user has performed the sliding operation. To be specific, the detecting unit 143 detects a contour in an image by performing specified processing, for example, binarization processing of a luminance value of image data, for the image corresponding to the image data displayed on the display unit 11, and determines whether the detected contour is in the slid range. For example, in the case illustrated in FIG. 12, the detecting unit 143 detects the contour between a background and a subject area of a subject K1, as the boundary. When the detecting unit 143 determines that there is a boundary of areas having different features in the slid range where the user has performed the sliding operation (Yes at step S203), the operating terminal 1*a* proceeds to step S204 described below. On the other hand, when the detecting unit 143 determines that there is no boundary of areas having different features in the slid range where the user has performed the sliding operation (No at step S203), the operating terminal 1*a* proceeds to step S206 described below.

At step S204, the detecting unit 143 determines a direction of the boundary of areas having different features of the image, based on a determination result of a touched area input from the determining unit 142. For example, in the case illustrated in FIG. 12, the detecting unit 143 determines the direction of the boundary of the subject K1 in the touched area of an index finger R1 of the user.

Figure 13A:
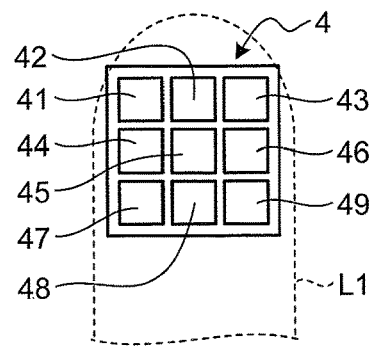
FIG. 13A is an operation diagram for schematically describing an operation of a displacement generating unit of the operating terminal according to the second embodiment of the present invention.
Figure 13B:
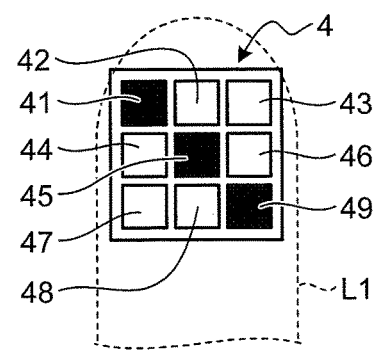
FIG. 13B is an operation diagram schematically describing an operation of the displacement generating unit of the operating terminal according to the second embodiment of the present invention.
Figure 13C:
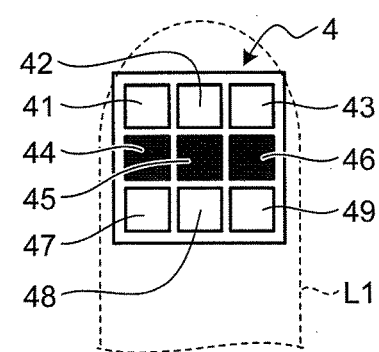
FIG. 13C is an operation diagram schematically describing an operation of the displacement generating unit of the operating terminal according to the second embodiment of the present invention.

Following that, the signal generating unit 144 generates a drive signal of an uneven pattern in the boundary direction, based on the determination result determined by the determining unit 142, and the uneven pattern in the boundary direction detected by the detecting unit 143, and outputs the drive signal to the displacement generating unit 4 (step S205). Accordingly, as illustrated in FIGS. 13A to 13C, the user performs the sliding operation with the index finger R1, whereby the displacement portions 41 to 49 of the displacement generating unit 4 respectively are projected and retracted according to the boundary of areas having different features on the image in the touch (FIG. 13A→FIG. 13B→FIG. 13C). Therefore, the user feels the unevenness with an index finger L1 of a left hand, thereby to intuitively grasp a composition of the image in more detail. Note that, in FIGS. 12, and 13A to 13C, the displacement portions 41 to 49 in a protruding state are expressed by being filled in black for simplification of the description. With such improvement, protruding portions (displacement portions 41 to 49) are arranged corresponding to the direction of change of the boundary of areas having different features on the image (a diagonal direction from the waist line of the person in FIG. 12). Vertical, horizontal, and diagonal (upward to the right and upward to the left) directions can be expressed with the nine dots. The determination of the boundary by the detecting unit 143 may be performed with respect to a color, brightness, a pattern, and the like, for each screen area, and change thereof may be determined. While FIG. 12 is illustrated in black and white, in reality, such change of the image feature can be found in a boundary between a background and a person, or a portion where a hand and a body overlap with each other in the case of the person, and generally, can be recognized as a contour. Further, feeling of the contour differs depending on a way of moving a finger. However, if a change of projection and retraction is generated based on the same surface as the display screen of the displacement generating unit 4, the sense of touch corresponding to the change direction can be obtained.

Following that, when there has been a touch to the touch panel 12 (Yes at step S206), the operating terminal 1*a* returns the processing to step S202. On the other hand, when there has been no touch to the touch panel 12 (No at step S206), the operating terminal 1*a* terminates the present processing.

According to the second embodiment of the present invention described above, the signal generating unit 144 generates the drive signal that indicate a drive amount for causing the displacement generating unit 4 to be projected and retracted, based on the determination result determined by the determining unit 142 and the detection result detected by the detecting unit 143, and outputs the drive signal to the displacement generating unit 4 to cause the displacement generating unit 4 to be projected and retracted. Therefore, even a user without knowledge about Braille or a user with impaired vision can intuitively grasp the image displayed on the display unit 11 or the composition at the time of capturing an image.

Further, according to the second embodiment of the present invention, the signal generating unit 144 generates and outputs the drive signals of the respective displacement portions 41 to 49. Therefore, the composition of the image and the contour of the subject can be intuitively grasped in more detail.

In the second embodiment of the present invention, the displacement generating unit 4 and the operating terminal 1*a* are integrally provided. However, the displacement generating unit 4 and the operating terminal 1*a* may be provided separately. For example, the displacement generating unit 4 may be caused to function as an accessory attachable and detachable to and from the operating terminal 1*a*.

Third Embodiment

Next, a third embodiment of the present invention will be described. In the third embodiment, a case in which the operating terminal according to the first embodiment described above is applied to an imaging device. Therefore, hereinafter, a configuration of an imaging device according to the third embodiment will be described, and then processing executed by the imaging device according to the third embodiment will be described. The same elements as the operating terminal 1 and the external device 2 according to the first embodiment are denoted by the same reference signs, and description is omitted.

Schematic Configuration of Imaging System

Figure 14:
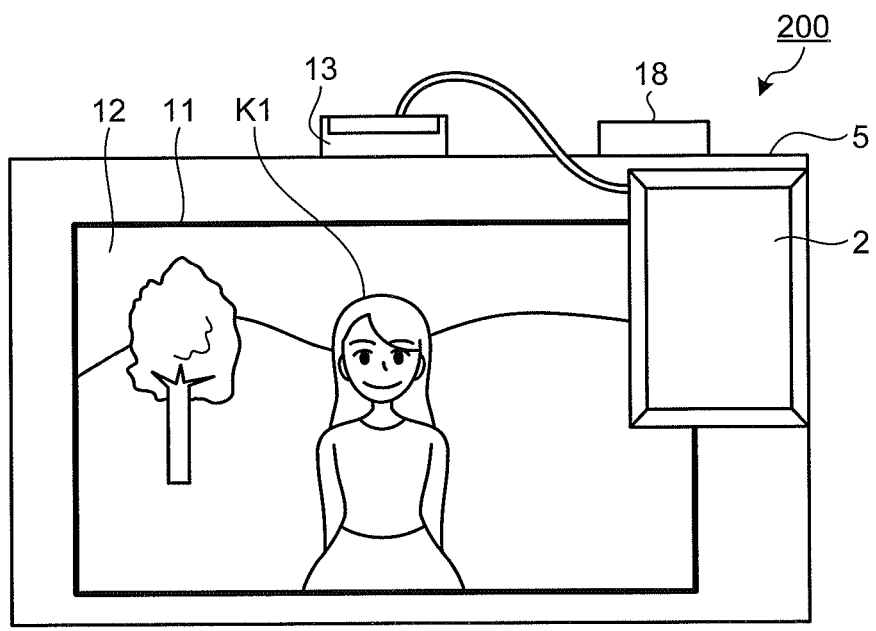
FIG. 14 is a schematic configuration diagram of an imaging system according to a third embodiment of the present invention.
Figure 15:
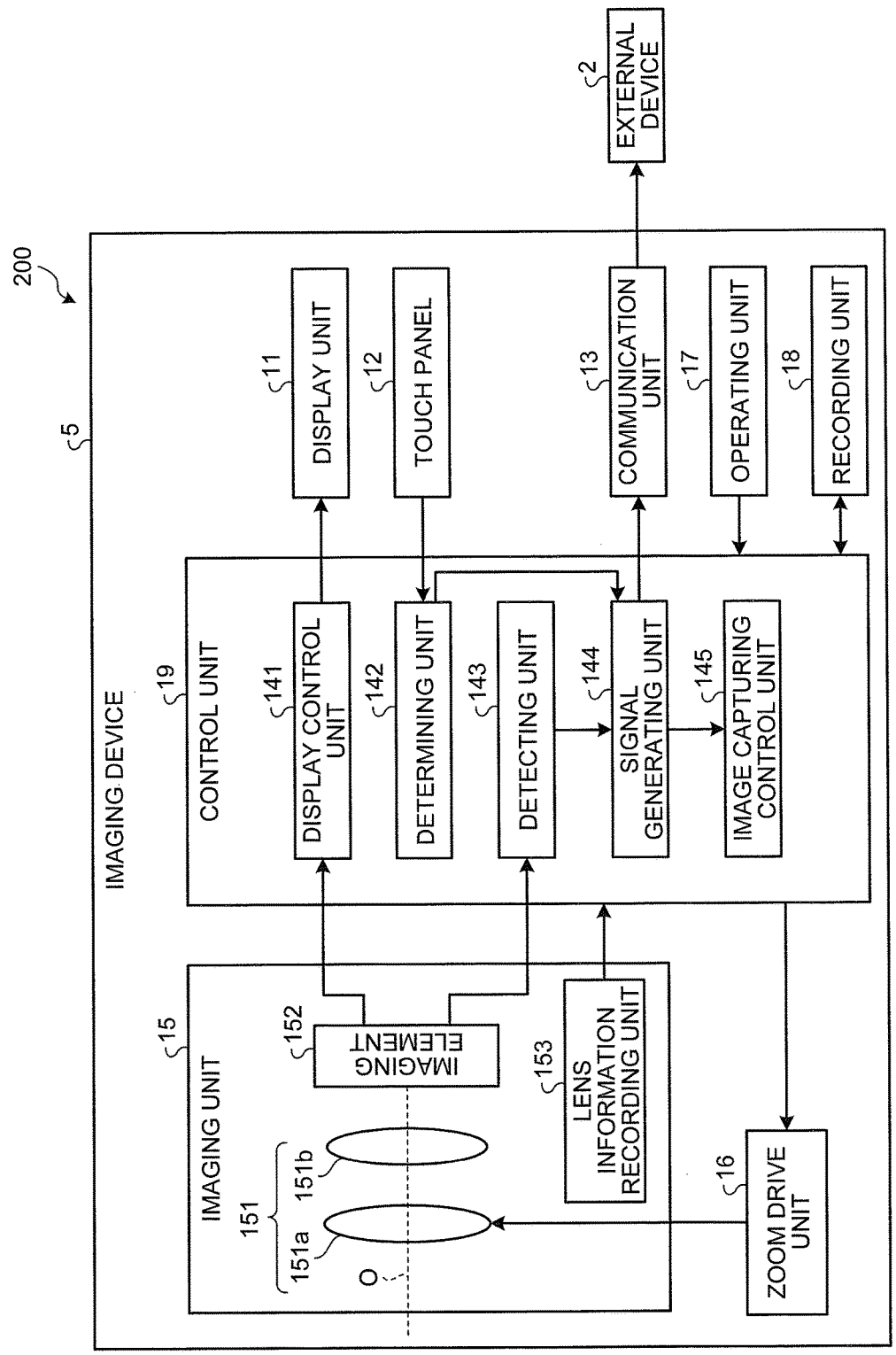
FIG. 15 is a block diagram illustrating a functional configuration of the imaging system according to the third embodiment of the present invention.

FIG. 14 is a schematic configuration diagram of an imaging system according to the third embodiment. FIG. 15 is a block diagram illustrating a functional configuration of the imaging system according to the third embodiment.

An imaging system 200 according to FIGS. 14 and 15 includes an imaging device 5 that images a subject to generate image data of the subject, and an external device 2 which is configured to project and retract a part of members thereof so as to be displaced, based on a drive signal input from the imaging device 5. Note that in the third embodiment, the imaging device 5 functions as an operating terminal.

Configuration of Imaging Device

Next, a configuration of the imaging device 5 will be described.

The imaging device 5 includes a display unit 11, a touch panel 12, a communication unit 13, an imaging unit 15, a zoom drive unit 16, an operating unit 17, a recording unit 18, and a control unit 19.

The imaging unit 15 includes an optical system 151 that forms a subject image, an imaging element 152 that receives the subject image formed by the optical system 151 and generates image data by performing photoelectric conversion, and a lens information recording unit 153 that records lens information related to the optical system 151.

The optical system 151 includes a zoom optical system 151a and a focus optical system 151b. The zoom optical system 151a changes a focal length of the imaging unit 15 by being moved and extended along an optical axis O. The focus optical system 151b adjusts a focus position of the imaging unit 15 by being moved along the optical axis O.

The zoom drive unit 16 moves the zoom optical system 151a along the optical axis O under control of the control unit 19. The zoom drive unit 16 is configured by a stepping motor, a DC motor, or the like.

The operating unit 17 receives an input of an instruction signal that instructs various operations related to the imaging device 5. The operating unit 17 is configured by a power source switch that switches a power source state of the imaging device 5 to an ON state and an OFF state, a release switch that receives an input of a release signal that provides an instruction of capturing an image, a mode switching switch that switches a mode of the imaging device 5, and the like.

The recording unit 18 records image data input through the control unit 19, a program for operating the imaging device 5, and the like. The recording unit 18 is configured by a synchronous dynamic random access memory (SDRAM), a flash memory, a memory card, and the like.

The control unit 19 includes a display control unit 141, a determining unit 142, a detecting unit 143, a signal generating unit 144, and an image capturing control unit 145.

The image capturing control unit 145 controls capturing of an image by the imaging unit 15. To be specific, the image capturing control unit 145 causes the imaging unit 15 to execute capturing of an image when the release signal is input from the operating unit 17.

Processing of Imaging Device

Figure 16:
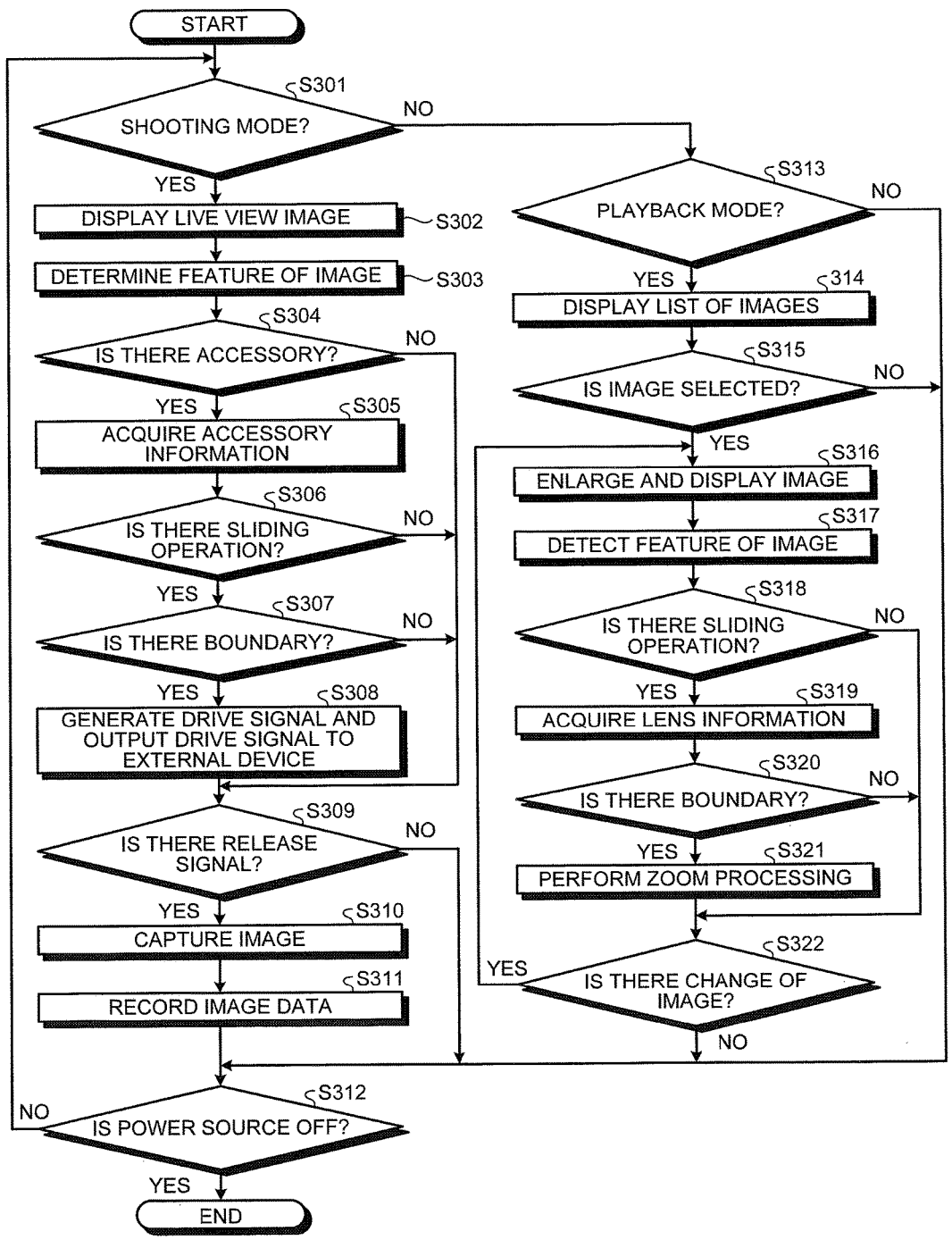
FIG. 16 is a flowchart illustrating an outline of processing executed by an imaging device according to the third embodiment of the present invention.

Next, processing executed by the imaging device 5 will be described. FIG. 16 is a flowchart illustrating an outline of processing executed by the imaging device 5.

Figure 17:
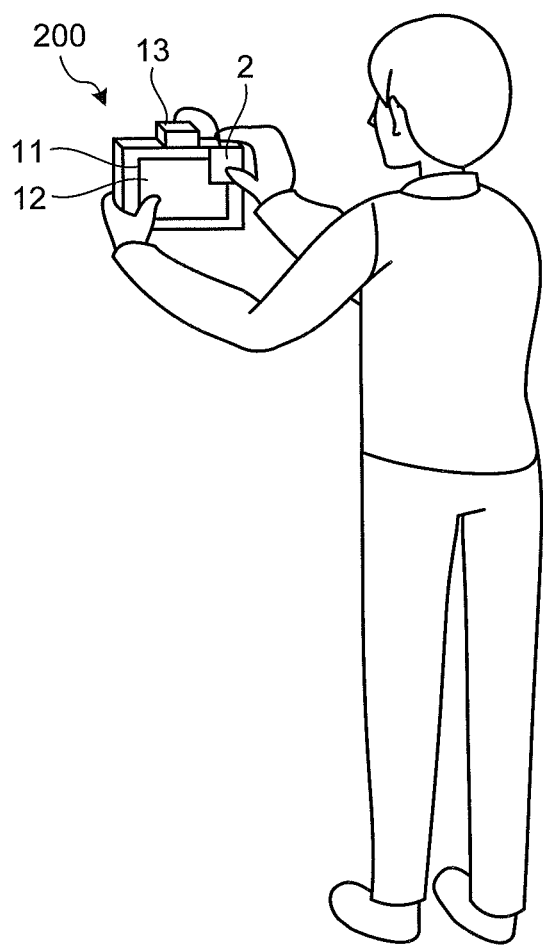
FIG. 17 is a diagram illustrating a state of when an image is captured using the imaging device according to the third embodiment of the present invention.

First, as illustrated in FIG. 16, reference will be made to a case in which the imaging device 5 is set to a shooting mode (Yes at step S301). In this case, the display control unit 141 displays a live view image corresponding to image data generated by the imaging unit 15, in the display unit 11 (step S302). To be specific, as illustrated in FIG. 17, the user captures an image while placing a thumb on the external device 2 and holding the imaging system 200 with the left hand.

Following that, the detecting unit 143 determines a feature of the live view image (step S303). To be specific, the detecting unit 143 detects a boundary of areas having different features, for example, brightness, in the live view image, based on live view image data. For example, the detecting unit 143 detects the boundary between the sky and the ground in the live view image, based on the live view image data.

Following that, when the external device 2 as an accessory is connected to the communication unit 13 of the imaging device 5 (Yes at step S304), the control unit 19 acquires accessory information from the external device 2 (step S305). After step S305, the imaging device 5 proceeds to step S306 described below. On the other hand, when the external device 2 as an accessory is not connected to the communication unit 13 of the imaging device 5 (No at step S304), the imaging device 5 proceeds to step S309 described below.

Figure 18:
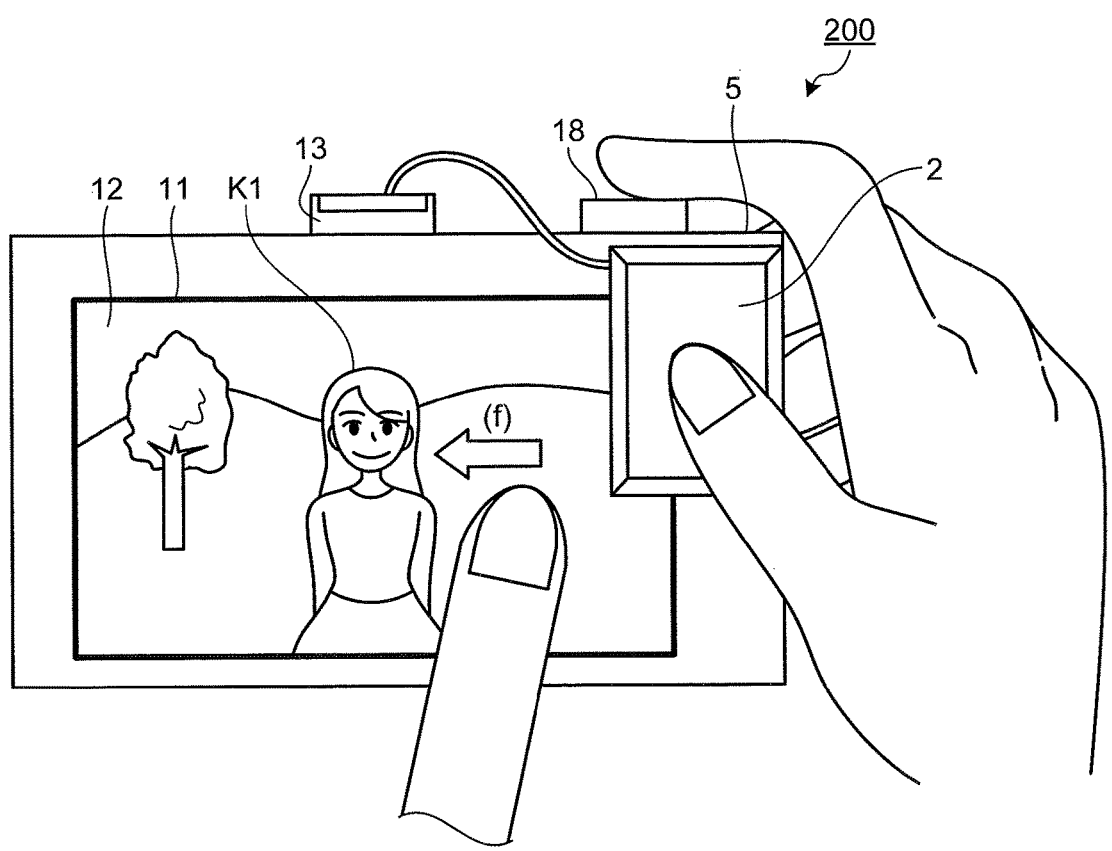
FIG. 18 is a diagram schematically illustrating a state in which a user performs a sliding operation to the imaging device according to the third embodiment of the present invention.

At step S306, when there has been a sliding operation to the touch panel 12 (Yes at step S306), and when the detecting unit 143 has detected the boundary of areas having different features on a locus of the sliding operation (Yes at step S307), the signal generating unit 144 generates a drive signal that indicates a drive amount for causing a part of the external device 2 to be projected and retracted, based on a determination result determined by the determining unit 142 and a detection result detected by the detecting unit 143, and outputs the drive signal to the external device 2 (step S308). Accordingly, as illustrated in FIG. 18, when the user performs the sliding operation (see the arrow (f) in FIG. 18) to the image displayed on the display unit 11, a part of the external device 2 is projected and retracted, whereby the user can intuitively grasp the boundary between an area of a subject K1 and a background area on the image. Further, the user can grasp an area or a contour of the subject K1 while holding a finger on the operating unit 17. Therefore, the user can be prevented from missing a photo opportunity.

Following that, when there has been a release signal from the operating unit 17 (Yes at step S309), the image capturing control unit 145 causes the imaging unit 15 to execute capturing of an image (step S310), and records the image data generated by the imaging unit 15, in the recording unit 18 (step S311).

Following that, when the power source is turned OFF by an operation of the operating unit 17 (Yes at step S312), the imaging device 5 terminates the present processing. On the other hand, when the power source is not turned OFF by the operation of the operating unit 17 (No at step S312), the imaging device 5 returns the processing to step S301.

At step S306, when there has been no sliding operation to the touch panel 12 (No at step S306), the imaging device 5 proceeds to step S309.

At step S307, when the boundary of areas having different features is not detected on the locus of the sliding operation by the detecting unit 143 (No at step S307), the imaging device 5 proceeds to step S309.

At step S309, when there has been no release signal from the operating unit 17 (No at step S309), the imaging device 5 proceeds to step S312.

Next, reference will be made to a case where the imaging device 5 is set to a playback mode (Yes at step S313) when the imaging device 5 is not set to the shooting mode (No at step S301). At this time, the display control unit 141 displays, in the display unit 11, a list of images respectively corresponding to a plurality of image data recorded in the recording unit 18 (step S314).

Following that, when an image has been selected through the touch panel 12 or the operating unit 17 from among the plurality of images displayed on the display unit 11 (Yes at step S315), the display control unit 141 enlarges and displays the selected image in the display unit 11 (step S316).

Following that, the detecting unit 143 detects a feature of the image enlarged and displayed on the display unit 11 (step S317).

Following that, when there has been a sliding operation to the touch panel 12 (Yes at step S318), the imaging device 5 proceeds to the step S319 described below. On the other hand, when there has been no sliding operation to the touch panel 12 (No at step S318), the imaging device 5 proceeds to step S322 described below.

At step S319, the control unit 19 acquires the lens information from the lens information recording unit 153 of the imaging unit 15.

Following that, when the detecting unit 143 has detected that there is a boundary of areas having different features on the locus of the sliding operation (Yes at step S320), the image capturing control unit 145 drives the zoom drive unit 16 according to the drive signal generated by the signal generating unit 144, based on the determination result determined by the determining unit 142 and the detection result detected by the detecting unit 143, to execute zoom processing including zoom up that extends the zoom optical system 151a or zoom down that retracts the zoom optical system 151a (step S321). Accordingly, the user can intuitively grasp the unevenness of the image by the extension or retraction of the zoom optical system 151a from or into the housing of the imaging device 5.

Following that, when there has been change of the image displayed on the display unit 11 through the operating unit 17 (Yes at step S322), the imaging device 5 returns the processing to step S316. On the other hand, when there has been no change of the image displayed on the display unit 11 through the operating unit 17 (No at step S322), the imaging device 5 proceeds to step S312.

At step S320, when the detecting unit 143 has determined that there has been no change in the feature of the image on the locus of the sliding operation (No at step S320), the imaging device 5 proceeds to step S322.

At step S313, when the imaging device 5 is not set to the playback mode (No at step S313), the imaging device 5 proceeds to step S312.

At step S315, when no image has been selected through the touch panel 12 or the operating unit 17 from among the plurality of images displayed on the display unit 11 (No at step S315), the imaging device 5 proceeds to step S312.

According to the third embodiment of the present invention described above, the signal generating unit 144 generates the drive signal that indicates the drive amount for displacing the external device 2, based on the determination result determined by the determining unit 142 and the detection result detected by the detecting unit 143, and outputs the drive signal to the external device 2 to cause a part of the external device 2 to be projected and retracted. Therefore, even a user without knowledge about Braille or a user with impaired vision can intuitively grasp the boundary of areas having different features in the image displayed on the display unit 11, or a schematic composition at the time of capturing an image.

Other Embodiments

An imaging device according to the present invention can be applied to electronic devices such as a digital camera or a digital video camera to which an accessory or the like can be mounted, and a mobile phone or a tablet-type mobile device having an imaging function, other than a digital single-lens reflex camera. If such user assistance that appeals to a user's sense (here, a sense of touch) is performed, auxiliary information other than visual confirmation can be obtained in industrial devices or medical devices, and more reliable operations than a simple touch or sliding, and its determination can be possible. It is not necessary to record an imaging result like a camera, and this technology may be used at the time of observation. Therefore, this terminal may be used as an observation device that effectively uses the user's sense, and such an idea is effective for user assistance such as a blind operation.

Programs executed by the operating terminal and the imaging device according to the present invention are recorded in a computer-readable recording medium such as a CD-ROM, a flexible disk (FD), a CD-R, a digital versatile disk (DVD), a USB medium, or flash memory, in file data in an installable format or executable format.

Further, the programs executed by the operating terminal and the imaging device according to some embodiments may be provided by being stored on a computer connected to a network such as the Internet, and downloaded through the network. The programs executed by the operating terminal and the imaging device according to some embodiments may be provided or distributed through the network such as the Internet.

Note that, in the description of the flowcharts in the present specification, the context of the processing among the steps has been clearly indicated using the expressions such as "first", "then", and "following that". However, the order of the processing necessary for implementing the present invention is not uniquely determined by such expressions. That is, the order of the processing in the flowcharts described in the present specification can be changed within a consistent range.

The present invention may include various embodiments that are not described here, and various design changes and the like can be performed within the scope of the technical idea specified by claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operating terminal for operating an external device configured to project and retract a part of a surface of the external device, the operating terminal comprising:
   a display configured to display an image;
   a touch panel provided superimposed on a display area of the display, and configured to detect a touched area of an object from an outside and to receive a position signal in response to the touched area; and
   a processor executing instructions to:
      determine a change of the touched area on the touch panel by determining a path of the touched area, based on the position signal received by the touch panel;
      detect a boundary of areas having different features in the touched area in the image; and
      generate a drive signal that indicates a drive amount for causing the part of the surface of the external device to be projected and retracted, based on a determination result and a detection result, and to output the drive signal to the external device;
   wherein a relative intensity of displacement on the surface of the external device caused by the projection and retraction is modulated by the drive signal in response to the path of the touched area.

2. The operating terminal according to claim 1, wherein when it is determined that the touched area repeatedly traces a same path, the processor generates the drive signal for increasing the drive amount, and outputs the drive signal to the external device.

3. The operating terminal according to claim 1, wherein the external device includes a plurality of members, and is configured to project and retract the plurality of members, respectively, and the processor is configured to generate drive signals for respectively causing the plurality of members to be projected and retracted, according to a direction of a change of the boundary of the areas having different features, and to output the drive signals to the external device.

4. The operating terminal according to claim 1, further comprising a communication unit which is configured to communicate with the external device, and to which the external device is detachably connected.

5. The operating terminal according to claim 1, further comprising:

an image acquisition device configured to image a subject to generate image data of the subject; and the processor is configured to display, on the display, an image corresponding to the image data generated by the image acquisition device.

6. The operating terminal according to claim 1, wherein the features are one or more of distance information, luminance information, and color information of a subject included in the image.

7. The operating terminal according to claim 1, wherein the part of the surface of the external device is projectable and retractable in response to the generated drive signal.

8. The operating terminal according to claim 1, wherein the intensity of displacement on the surface of the external device caused by the projection and retraction is increased by the drive signal when the path of the touched area is repeatedly traced.

9. An operating method executed by an operating terminal for operating an external device configured to project and retract a part of a surface of the external device, the operating terminal comprising: a display configured to display an image; and a touch panel provided superimposed on a display area of the display, and configured to detect a touched area of an object from an outside and to receive a position signal in response to the touched area, the method comprising:

determining a change of the touched area on the touch panel by determining a path of the touched area, based on the position signal received by the touch panel;

detecting a boundary of areas having different features in the touched area in the image; and generating a drive signal that indicates a drive amount for causing the part of the surface of the external device to be projected and retracted, based on a determination result in determining the change of the touched area on the touch panel and a detection result in detecting the boundary of the areas having different features in the touched area in the image, and outputting the drive signal to the external device;

wherein a relative intensity of displacement on the surface of the external device caused by the projection and retraction is modulated by the drive signal in response to the path of the touched area.

10. The operating method according to claim 9, wherein the part of the surface of the external device is projected and retracted in response to the generated drive signal.

11. The operating method according to claim 9, wherein the intensity of displacement on the surface of the external device caused by the projection and retraction is increased by the drive signal when the path of the touched area is repeatedly traced.

* * * * *